United States Patent
Ritzinger

(10) Patent No.: US 10,056,212 B2
(45) Date of Patent: Aug. 21, 2018

(54) RESIDUAL CURRENT CIRCUIT BREAKER

(71) Applicant: EATON INDUSTRIES (AUSTRIA) GMBH, Schrems (AT)

(72) Inventor: Georg Ritzinger, Wolfpassing (AT)

(73) Assignee: EATON INTELLIGENT POWER LIMITED, Dublin (IE)

(*) Notice: Subject to any disclaimer, the term of this patent is extended or adjusted under 35 U.S.C. 154(b) by 351 days.

(21) Appl. No.: 14/892,202

(22) PCT Filed: May 23, 2014

(86) PCT No.: PCT/EP2014/060671
§ 371 (c)(1),
(2) Date: Nov. 19, 2015

(87) PCT Pub. No.: WO2014/187961
PCT Pub. Date: Nov. 27, 2014

(65) Prior Publication Data
US 2016/0141129 A1    May 19, 2016

(30) Foreign Application Priority Data

May 23, 2013  (DE) ........................ 10 2013 105 310

(51) Int. Cl.
*H01H 73/00* (2006.01)
*H01H 47/00* (2006.01)
(Continued)

(52) U.S. Cl.
CPC .......... *H01H 47/007* (2013.01); *H01H 83/02* (2013.01); *H02H 3/044* (2013.01);
(Continued)

(58) Field of Classification Search
USPC .......................................... 361/42, 93.1, 115
See application file for complete search history.

(56) References Cited

U.S. PATENT DOCUMENTS

| | | |
|---|---|---|
| 6,437,954 B1 | 8/2002 | Harr |
| 2005/0030684 A1 | 2/2005 | Brandonisio |

(Continued)

FOREIGN PATENT DOCUMENTS

| | | |
|---|---|---|
| CN | 1484881 A | 3/2004 |
| CN | 101965620 A | 2/2011 |

(Continued)

OTHER PUBLICATIONS

Anonymous: "Photo MOS Relay Product Description E D", Sep. 28, 2010 (Sep. 28, 2010), pp. 1-4, XP055131598, Retrieved from the Internet: URL: http://search.alkon.net/cgi-bin/pdf-pl?pdfname=cosmo/mos-cd/descrip.pdf.

*Primary Examiner* — Danny Nguyen
(74) *Attorney, Agent, or Firm* — Leydig, Voit & Mayer, Ltd.

(57) ABSTRACT

A residual current circuit breaker has a summation current transformer that has primary windings as well as a secondary and a tertiary winding, the secondary winding forming a circuit with an electronic trigger unit that is independent of the network voltage, and the tertiary winding forming a circuit with an electronic trigger unit that is dependent on the network voltage. The residual current circuit breaker may have an electronic control unit designed to actuate a switch upon predefinable actuation by the network voltage-dependent electronic trigger unit, and the switch, when in the actuated state, may interrupt contact of the secondary winding with the network voltage-independent electronic trigger unit and establishes contact of the tertiary winding with the network voltage-dependent electronic trigger unit.

9 Claims, 1 Drawing Sheet

(51) Int. Cl.
*H01H 83/02* (2006.01)
*H02H 3/04* (2006.01)
*H02H 3/05* (2006.01)
*H02H 3/33* (2006.01)
*H01H 83/14* (2006.01)

(52) U.S. Cl.
CPC ............... *H02H 3/05* (2013.01); *H02H 3/33* (2013.01); *H02H 3/332* (2013.01); *H01H 83/144* (2013.01)

(56) References Cited

U.S. PATENT DOCUMENTS

2007/0247773 A1* 10/2007 Bartonek ................ H02H 3/33
 361/91.1
2009/0063064 A1* 3/2009 Jackson ................ H02H 1/063
 702/58
2010/0308943 A1 12/2010 Dobusch

FOREIGN PATENT DOCUMENTS

| DE | 19735412 A1 | 2/1999 |
| DE | 19735412 A1 | 5/2006 |
| EP | 1478069 A1 | 11/2004 |

* cited by examiner

RESIDUAL CURRENT CIRCUIT BREAKER

CROSS-REFERENCE TO RELATED APPLICATIONS

This application is a U.S. national stage application under 35 U.S.C. § 371 of International Application No. PCT/EP2014/060671, filed on May 23, 2014, and claims benefit to German Patent Application No. DE 10 2013 105 310.6, filed on May 23, 2013. The International Application was published in German on Nov. 27, 2014, as WO 2014/187961 A1 under PCT Article 21(2).

FIELD

The invention relates to a residual current circuit breaker.

BACKGROUND

It is a legal requirement in several countries for a residual current circuit breaker to be able to detect a sinusoidal residual current completely independently of the mains voltage and, if necessary, to trip. However, the function of residual current circuit breakers of this type is very limited. Additional demands on a residual current circuit breaker, such as reliably detecting smooth and/or pulsating DC residual currents, generally require a trip circuit which is dependent on the mains voltage in order to be implemented. In this case, however, it should be ensured that the required basic functions are furthermore fulfilled by the relevant residual current circuit breaker in the event of a failure of said trip circuit which is dependent on the mains voltage.

Residual current circuit breakers are therefore known which have both a trip circuit which is independent of the mains voltage and a trip circuit which is dependent on the mains voltage. However, in such residual current circuit breakers, it has proven problematic to ensure that the trip circuit dependent on the mains voltage is in fact also only in operation when said circuit is functioning correctly and that otherwise the trip circuit which is independent of the mains voltage is used.

SUMMARY

An aspect of the invention provides a residual current circuit breaker, comprising: a differential current transformer including primary windings, a secondary winding, and a tertiary winding; and a control electronic system, wherein the secondary winding are connected by circuitry to a first trip electronic system, which is independent of the mains voltage, wherein the tertiary winding are connected by circuitry to a second trip electronic system, which is dependent on the mains voltage, wherein the control electronic system, when predeterminably actuated by the second trip electronic system, is configured to actuate a switch, wherein, when actuated, the switch breaks a first contact between the secondary winding and the first trip electronic system and establishes a second contact between the tertiary winding and the second trip electronic system.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An aspect of the invention discloses a residual current circuit breaker by means of which the aforementioned disadvantages can be avoided and which can ensure that, if the trip circuit dependent on the mains voltage is faulty, a switch is made to the trip circuit which is independent of the mains network.

It can thus be ensured that the trip circuit dependent on the mains voltage can only be operated as long as it is also functioning correctly or as intended. As soon as the trip electronic system is not functioning correctly, said system no longer actuates the control electronic system correctly in the expected manner, upon which the control electronic system switches off the trip electronic system which is dependent on the mains voltage or electrically disconnects it from the corresponding winding of the differential current transformer, and simultaneously activates the trip electronic system which is independent of the mains voltage by either connecting or contacting it by circuitry to the corresponding winding of the differential current transformer. As a result, not only can it be ensured that one of the two trip electronic systems is always activated, but that the trip electronic system dependent on the mains voltage is only in operation if it is also functioning in accordance with the requirements thereof.

Reference is hereby explicitly made to the wording of the claims, whereby the claims are included in the description at this point by reference, and are considered to have been reproduced word for word.

Figure 1:
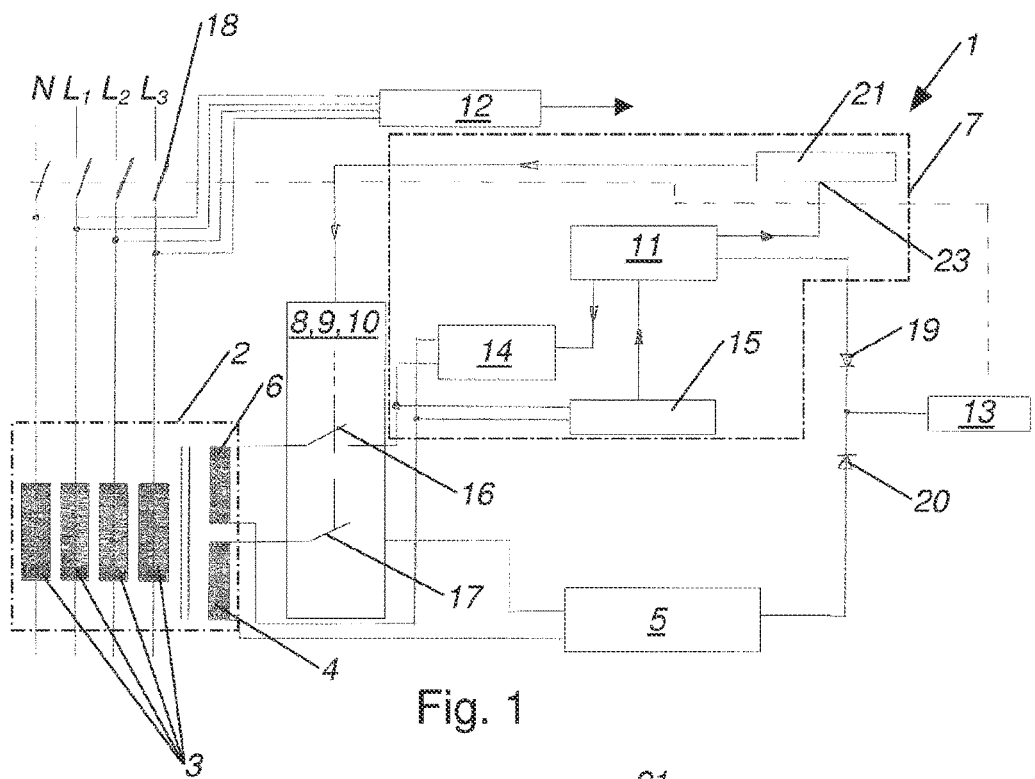
FIG. 1 is a block diagram of the preferred embodiment of a residual current circuit breaker.

FIG. 1 shows a block diagram of a residual current circuit breaker 1 comprising a differential current transformer 2 which has primary windings 3, a secondary winding 4 and a tertiary winding 6, the secondary winding 4 being connected by circuitry to a trip electronic system 5 which is independent of the mains voltage, the tertiary winding 6 being connected by circuitry to a trip electronic system 7 which is dependent on the mains voltage, wherein the residual current circuit breaker 1 comprises a control electronic system 21 which, when predeterminably actuated by the trip electronic system (7) which is dependent on the mains voltage, is designed to actuate a switch 8, and, when actuated, the switch 8 breaks the contact between the secondary winding 4 and the trip electronic system 5 which is independent of the mains voltage, and in particular substantially simultaneously establishes the contact between the tertiary winding 6 and the trip electronic system 7 which is dependent on the mains voltage.

As a result, it can be ensured that the trip circuit 7 dependent on the mains voltage is only operated as long as it is also functioning correctly or as intended. As soon as the trip electronic system 7 dependent on the mains voltage stops functioning correctly, it no longer actuates the control electronic system 21 correctly in the expected manner, upon which the control electronic system 21 switches off the trip electronic system 7 dependent on the mains voltage or electrically disconnects it from the corresponding tertiary winding 6 of the differential current transformer 2 and simultaneously activates the trip electronic system 5, which is independent of the mains voltage, by connecting or contacting it by circuitry to the corresponding secondary winding 4 of the differential current transformer 2. As a result, not only can it be ensured that one of the two trip electronic systems 5, 7 is always activated, but that the trip electronic system 7 which is dependent on the mains voltage is only in operation if it is also functioning in accordance with the requirements thereof.

The residual current circuit breaker 1 in question comprises a differential current transformer 2 which comprises a core, in particular a toroidal tape core. This core has an opening through which the primary windings 3 are guided. The term "primary winding 3" also includes the fact that the relevant conductors, each of which opens up into terminals of the residual current circuit breaker 1, are only passed through the opening without encompassing the cross section of the core. It is provided to connect the mains conductors N, $L_1$, $L_2$, $L_3$ to the relevant terminals of the residual current circuit breaker 1, it also being possible to provide two-pole embodiments of the residual current circuit breaker 1 in question.

Furthermore, a secondary winding 4 and a tertiary winding 6 are arranged on the differential current transformer 2 and are typically wound around the cross section of the core.

The residual current circuit breaker 1 in question comprises a trip electronic system 5 which is independent of the mains voltage and a trip electronic system 7 which is dependent on the mains voltage.

The trip electronic system 5 independent of the mains voltage is connected or contacted by circuitry to the secondary winding 4 and can be designed in accordance with the known embodiments of corresponding trip electronic systems 5 which are independent of the mains voltage, it being provided in particular to design said systems comprising an energy store circuit and a comparator circuit arranged downstream thereof.

The trip electronic system 7 which is dependent on the mains voltage is preferably designed in accordance with FIG. 1 and is connected or contacted by circuitry to the tertiary winding 6. The trip electronic system 5 which is dependent on the mains voltage has a digital signal processing unit 11 which is preferably formed as a microcomputer or microcontroller.

According to the preferred embodiment, the trip electronic system 7 dependent on the mains voltage is also designed to detect smooth DC residual currents. The preferred embodiment shown of the trip electronic system 7 dependent on the mains voltage is described in the following.

In this case, the digital signal processing unit 11 actuates a sinusoidal current source 14 which is connected by circuitry to the tertiary winding 6. As a result, it is possible to premagnetize the core of the differential current transformer 2 using an excitation frequency f. When a DC residual current occurs, due to non-linear activity signal components occur at the double excitation frequency 2 f, which components are proportional to the size of the occurring DC residual current.

Furthermore, the tertiary winding 6 is connected by circuitry to a signal acquisition unit 15 which records the occurring signals from the tertiary winding 6 and optionally processes them and forwards them to the digital signal processing unit 11. In this case, the signal acquisition unit 15 can in particular also be designed to detect the signal components which occur at the double excitation frequency 2 f.

The incoming residual current signals which are provided by the signal acquisition unit 15 are processed in the digital signal processing unit 11 and compared with stored limit values or trip conditions.

In addition, the digital signal processing unit preferably generates a signal for the predefinable actuation of the control electronic system 21. In this case, the corresponding signal is a predeterminably changing control signal, in particular a predeterminable and periodically alternating signal, in particular a square wave signal. In particular, in this case the relevant signal is generated in the digital signal processing unit 11 such that a disruption to the internal program sequence in the digital signal processing unit 11 also leads to a disruption to the generation of the relevant signal.

The digital signal processing unit 11 therefore actuates the control electronic system 21 by means of the relevant signal during failure-free operation. In this case, when correspondingly actuated by the trip electronic system 7 which is dependent on the mains voltage, the control electronic system 21 actuates a switch 8 which is arranged in the residual current circuit breaker 1 between the secondary winding 4 or the tertiary winding 6 and the respectively associated trip electronic systems 5, 7. In this case, when actuated, the switch also breaks the contact between the secondary winding 4 and the trip electronic system 5 which is independent of the mains voltage and establishes the contact between the tertiary winding 6 and the trip electronic system 7 which is dependent on the mains voltage.

In this case, the switch 8 is preferably formed as a solid-state relay 9, the switch in particular being formed as a photo-MOS relay 10. By being formed as a solid-state relay 9, both a short switching time and reliable long-term operation can be achieved. By the switch preferably being formed as a photo-MOS relay 10, a galvanic separation of the individual circuits is also possible, as a result of which the correct function of the different circuits of the residual current circuit breaker 1 is advantageously assisted.

According to the preferred embodiment, the switch 8 comprises two breaks which are coupled so that each time the switch 8 is actuated, the two breaks are switched in each case. In this case, a first switching contact 16, which is arranged in the circuit connection between the tertiary winding 6 and the trip electronic system 7, which is dependent on the mains voltage, is formed as a make contact and a second switching contact 17, which is arranged in the circuit connection between the secondary winding 4 and the trip electronic system 5, which is independent of the mains voltage, is formed as a break contact. The term "make contact" in this case means that the relevant switch 8 closes the relevant switching contact 16 or holds it closed when it is actuated and only during such an actuation, and as long as a corresponding actuation does not occur, the relevant switching contact 16 is not closed and there is thus no conductive connection via said switching contact 16. According to the preferred embodiment, the switch is actuated by a permanent high signal.

The residual current circuit breaker 1 additionally comprises a power supply unit 12 for supplying the components dependent on the mains voltage.

A preferred embodiment, shown in FIG. 2, of a control electronic system 21 is described in the following.

As already stated, the digital signal processing unit 11 is preferably designed to issue a predeterminably changing control signal to a control input 23 of the control electronic system 21. According to the preferred embodiment, according to which the digital signal processing unit 11 comprises a processor which carries out the signal analysis of the residual current signal and optionally comprises an AC/DC converter for this purpose, the digital signal processing unit 11 also generates and issues the predeterminably changing control signal, said predeterminably changing control signal only being generated when the digital signal processing unit 11 is operating correctly in a predefinable manner. This can be achieved in a simple manner by correspondingly programming the processor. In this case, in addition to the other operating procedures, for example a predeterminably periodic square wave signal is preferably also issued to the control input 23 of the control electronic system 21 as a control signal, as is also shown in FIG. 2. However, other types of control signal can also be generated and issued. As a result, in the case of a residual current circuit breaker 1 having a trip electronic system 7 dependent on the mains voltage, not only is the presence of the supply voltage or of the components checked, but in fact the correct or predetermined function of the assemblies required for the purpose of the trip, which is dependent on the mains voltage. As a result, it can be ensured that such a residual current circuit breaker 1 continues to operate as a residual current circuit breaker 1 which is completely independent of the mains voltage in the event of the trip electronic system 7 which is dependent on the mains voltage not functioning. This also fully complies with the standards which do not permit residual current circuit breakers 1 which are dependent on the mains voltage.

According to the preferred embodiment, a corresponding control electronic system 21 is provided for the corresponding function of the switch 8, which system only activates an output when the correspondingly predetermined control signal is applied to the control input 23 of said electronic system. In principle, any type of corresponding circuit arrangement can be provided in this case.

Figure 2:
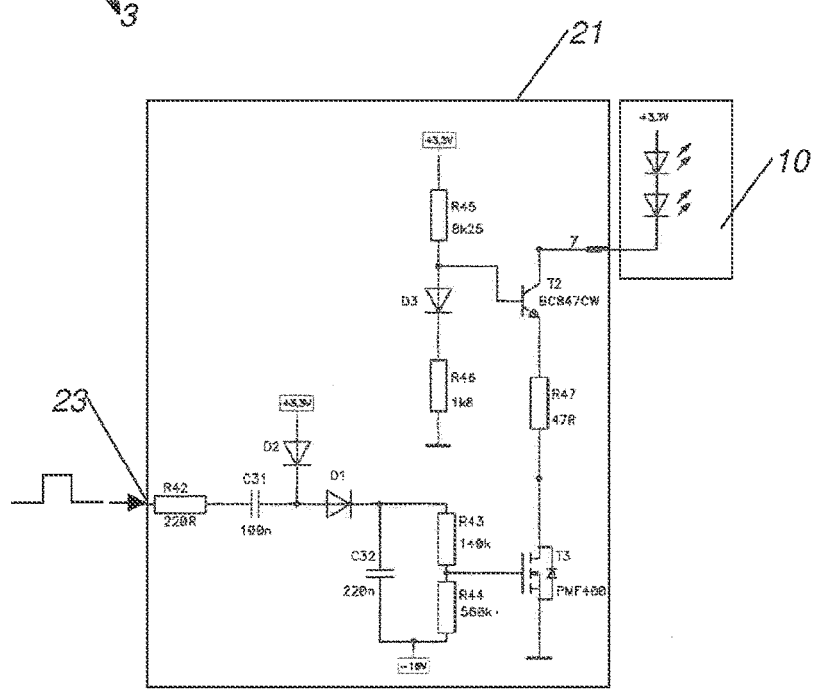
FIG. 2 is a preferred embodiment of a control electronic system of a residual current circuit breaker according to FIG. 1.

FIG. 2 shows a particularly preferred embodiment of a control electronic system 21 for a periodically square wave control signal, the internationally recognized switch symbol and dimensional information having been used in the figure.

The output of the control electronic system 21 is connected to the input of the solid-state relay 9, which is formed as a photo-MOS relay 10 according to FIG. 2, FIG. 2 only showing the LEDs provided for the actuation, and therefore not the photo-MOS relay 10 as a whole.

The residual current circuit breaker in question also comprises a trip relay 13 which is connected by circuitry to the two trip electronic systems 5, 7 by means of the diodes 19, 20.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A residual current circuit breaker, comprising:
a differential current transformer including primary windings, a secondary winding, and a tertiary winding; and
a control electronic system,
wherein the secondary winding is connected by circuitry to a first trip electronic system, which is independent of the mains voltage,
wherein the tertiary winding is connected by circuitry to a second trip electronic system, which is dependent on the mains voltage,
wherein the control electronic system, when predeterminably actuated by the second trip electronic system, is configured to actuate a switch, and
wherein, when actuated, the switch breaks a first contact between the secondary winding and the first trip electronic system and establishes a second contact between the tertiary winding and the second trip electronic system.

2. The breaker of claim 1, wherein the switch is configured as a solid-state relay.

3. The breaker of claim 1, wherein the switch is configured as a photo-MOS relay.

4. The breaker of claim 1, wherein the second trip electronic system includes a digital signal processing unit,
wherein the digital signal processing unit is configured to issue a predeterminably changing control signal to a control input of the control electronic system, and
wherein the control electronic system is configured to actuate the switch when the predeterminably changing control signal is applied to the control input.

5. The breaker of claim 1, wherein the second trip electronic system includes a digital signal processing unit.

6. The breaker of claim 1, wherein the second trip electronic system includes a digital signal processing unit configured to issue a predeterminably changing control signal to a control input of the control electronic system.

7. The breaker of claim 1, wherein the control electronic system configured to actuate the switch when a predeterminably changing control signal is applied to the control input.

8. The breaker of claim 2, wherein the second trip electronic system includes a digital signal processing unit,
wherein the digital signal processing unit is configured to issue a predeterminably changing control signal to a control input of the control electronic system, and
wherein the control electronic system is configured to actuate the switch when the predeterminably changing control signal is applied to the control input.

9. The breaker of claim 3, wherein the second trip electronic system includes a digital signal processing unit, wherein the digital signal processing unit is configured to issue a predeterminably changing control signal to a control input of the control electronic system, and wherein the control electronic system is configured to actuate the switch when the predeterminably changing control signal is applied to the control input.

* * * * *